United States Patent

Schnase et al.

[11] Patent Number: 6,078,928
[45] Date of Patent: Jun. 20, 2000

[54] SITE-SPECIFIC INTEREST PROFILING SYSTEM

[75] Inventors: John L. Schnase; Edward L. Cunnius, both of St. Louis, Mo.; Andrea P. McFadden, Wayne, Pa.; Thomas J. Klein, University City, Mo.; Thomas E. Hedrick; Robert Brookings Smith, both of St. Louis, Mo.

[73] Assignee: Missouri Botanical Garden, St. Louis, Mo.

[21] Appl. No.: 08/989,973

[22] Filed: Dec. 12, 1997

[51] Int. Cl.⁷ .................................................. G06F 19/00
[52] U.S. Cl. ........................... 707/104; 707/10; 707/102; 705/7; 705/26; 345/326
[58] Field of Search ........................... 707/104, 10, 1–6; 235/100–102, 379, 380; 340/990, 995; 345/326–327; 709/217, 218, 219; 705/26, 7

[56] References Cited

U.S. PATENT DOCUMENTS

| | | | |
|---|---|---|---|
| 4,654,512 | 3/1987 | Gardosi | 235/376 |
| 4,780,599 | 10/1988 | Baus | 235/383 |
| 4,827,425 | 5/1989 | Linden | 364/478 |
| 4,868,376 | 9/1989 | Lessin et al. | 235/492 |
| 4,874,935 | 10/1989 | Younger | 235/492 |
| 4,912,308 | 3/1990 | Takashira | 235/379 |

(List continued on next page.)

FOREIGN PATENT DOCUMENTS

| | | |
|---|---|---|
| PCT/US95/14168 | 5/1996 | WIPO . |
| PCT/US96/14658 | 3/1997 | WIPO . |

OTHER PUBLICATIONS

The New York Times Magazine, "Cash is Dying", James Gleick, Jun. 16, 1996.

Communications of the ACM, "Recommender Systems", Paul Resmick and Hal R. Varian, Mar., 1997.

Communications of the ACM, "A System for Sharing Recommendations", Loren Terveen, Will Hill, Brian Amento, David McDonald and Josh Creter, Mar., 1997.

Communications of the ACM, "Combining Social Networks and Collaborative Filtering", Henry Kautz, Bart Selman and Mehul Shah, Mar., 1997.

(List continued on next page.)

*Primary Examiner*—Hosain T. Alam
*Attorney, Agent, or Firm*—Bryan Cave LLP

[57] ABSTRACT

A system for capturing, developing and profiling an individual's interests in various sites, exhibits or items on display at an institution or facility and providing site- and/or theme-specific information based on these interests. The system preferably includes a collection of information associated with the sites, exhibits or items on display at an institution or facility, which is organized and is capable of being indexed by each particular site, exhibit or item location or item on display. The preferred system further includes a plurality of portable information storage devices, such as, for example, smart cards having non-volatile memory cable of being organized into a specialized data structure, uniquely assigned to visitors to such institutions or facilities. The data structure on the portable information storage device contains various fields including those designed to store biographical information about the visitor and an interest profile comprised of indexes relating to the sites, exhibits or items on display at such institutions or facilities identified and selected by the visitor. The system further includes means for allowing the visitor to select a particular site, exhibit or item of interest and for recording an index relating to the selection in the interest profile on the portable information storage device assigned to that particular visitor. Preferably, the system further includes means, such as, for example, an informational kiosk, for reading the stored indexes from the portable information storage devices and for retrieving the collected exhibit information related to those indexes stored on the portable information storage device by the visitor.

39 Claims, 9 Drawing Sheets

U.S. PATENT DOCUMENTS

| | | | |
|---|---|---|---|
| 5,038,025 | 8/1991 | Kodera | 235/492 |
| 5,047,614 | 9/1991 | Bianco | 235/385 |
| 5,170,046 | 12/1992 | Kusakabe | 235/492 |
| 5,200,600 | 4/1993 | Shinagawa | 235/492 |
| 5,237,157 | 8/1993 | Kaplan | 235/375 |
| 5,345,071 | 9/1994 | Dumont | 235/383 |
| 5,361,871 | 11/1994 | Gupta et al. | 186/61 |
| 5,380,991 | 1/1995 | Valencia et al. | 235/383 |
| 5,401,945 | 3/1995 | Buschmann et al. | 235/380 |
| 5,424,524 | 6/1995 | Ruppert et al. | 235/462 |
| 5,459,306 | 10/1995 | Stein et al. | 235/383 |
| 5,463,209 | 10/1995 | Figh et al. | 235/383 |
| 5,473,146 | 12/1995 | Goodwim, III | 235/383 |
| 5,478,989 | 12/1995 | Shepley | 235/375 |
| 5,528,490 | 6/1996 | Hill | 364/403 |
| 5,530,235 | 6/1996 | Stefik et al. | 235/492 |
| 5,559,313 | 9/1996 | Claus et al. | 235/380 |
| 5,566,327 | 10/1996 | Sehr | 395/600 |

OTHER PUBLICATIONS

Communications of the ACM, "Content–Based, Collaborative Recommendation", Marko Balabanovic and Yoav Shoham, Mar., 1997.

Communications of the ACM, "Personalized Navigation for the Web", James Rucker and Marcos J. Polanco, Mar., 1997.

Communicatiopns of the ACM, "Applying Collaborative Filtering to Usenet News", Joseph A. Konstan, Bradley N. Miller, David Maltz, Jonathan L. Herlocker, Lee R. Gordon and John Riedl, Mar., 1997.

Communications of the ACM, "Recommender Systems for Evaluating Computer Messages", Christopher Avery and Richard Zeckhauser, Mar., 1997.

PC Magazine, "Advice from the Web", Richard Dragon, Sep. 9, 1997.

Garden Center Software News, Press Releases, "Garden Center Software Upgrades Signs & Labels Package", Dec. 12, 1997.

ZD Internet Magazine, "Smart Cards Herald Advent of Silicon Wallet", Dave Kosiur, Feb., 1998.

Scientific American, "Smart Cards", Carol H. Fancher, Aug., 1996.

The Wall Street Journal, "The Smart Money is on 'Smart Cards', But Electronic Cash Seems Dumb to Some", Nikhil Deogun, Aug. 5, 1996.

Business Week, "The Ultimate Plastic", Amy Cortese, May 19, 1997.

Money, "The New Smart Card Fails to Impress Money's Reporter", Ellen Stark, Forecast, 1998.

Inquier Magazine, "Changing the World One TV Set at a Time", Michael Sokolove, Dec. 7, 1997.

Sun Microsystems, Press Releases, "Officemax Teams with Sun for Company–Wide Interactive Kiosk Project", Jan. 13, 1997.

Dow Jones Interactive Publications Library, "Symbol Scans Registry Market", James T. Madore, May 16, 1997.

Hoovers Company Profiles, "Symbol Technologies, Inc.", Undated.

NewsAlert–Story, "Symbol's Wearable Computing Solution Provides Faster Access to Data and Printing on Demand", Business Wire, Nov. 11, 1997.

Dow Jones Interactive Publications Library, "Here Scans the Bride . . . The Advanced Technology of Gift–Giving is Taking Retailer's Registry Programs to New Levels", The Washington Post, May 3, 1997.

Dow Jones Interactive Publications Library, "St. Nixed with its Christmas Registry for Kids, the World's Biggest Toy Store Just Might Put Santa Out of the Wish–list business", Los Angeles Times, Dec. 3, 1997

Dow Jones Interactive Publications Library, "Retailers Enjoy the Switch to Smart Cards, but U.S. Market is Difficult", Report on Smart Cards, Oct. 13, 1997.

C/New News.Com, "Computing, A Home Beyond the Desktop", Michael Kanellos, Nov. 18, 1997.

C/Net, "Intranets, Smart Cards Go Wireless at FSU", Tim Clark, Oct. 20, 1997.

The MIT Card, "Services Offered by the MIT Card", Campus Publications—Undated.

PC Week, "Smart Cards Move to Head of Class", Scott Berinato, Mar., 24, 1997.

www.phillynews.com, "Dear Santa, I'M Registered at . . . ", Kathy Boccella, Dec. 11, 1997.

"Design of an Adaptive Samrt Card withIn–Lab Experiments," Redy et al., Proceedings of the Sixth International Conference on Vehicale Navigation and Information Systems, 1995, pp. 134–139, Aug. 1995.

"IBM InfoSage," Reva Basch, Link–Up, Medford, pp. 17–18, retrieved at proquest.umi.com on Jul. 18, 1999, Nov. 1996.

| APPLICATION IDENTIFACTION | BYTES | TAG | LENGTH | DATA |
|---|---|---|---|---|
| APPLICATION TEMPLATE | 26 | 61 | 24 | |
| APPLICATION ID | 18 | 4F | 16 | SEE ISO 7816-5 |
| PATH | 6 | 51 | 4 | SEE ISO 7816-4 |

FIG. 3A

| CARDHOLDER INFORMATION | BYTES | TAG | LENGTH | DATA |
|---|---|---|---|---|
| CARDHOLDER DATA TEMPLATE | 137 | 65 | 135 | |
| NAME | 41 | 5B | 39 | SEE ISO 7816-6 SEC 6.1 |
| GENDER | 4 | 5F35 | 1 | a1 |
| DATE OF BIRTH | 11 | 5F2B | 8 | n8YYYYMMDD |
| ADDRESS | 67 | 5F42 | 64 | LINE1;LINE2;CITY;STATE;ZIP |
| PHONE | 12 | C5 | 10 | n10NNNNNNNNNN |

FIG. 3B

| APPLICATION DATA | BYTES | TAG | LENGTH | DATA |
|---|---|---|---|---|
| CARD USE COUNT | 4 | C1 | 2 | 2 BYTES BINARY CODE |
| INTEREST PROFILE TEMPLATE | 1262 | E0 | 1260 | SAMPLE STORAGE LAYOUT FOR 10 EXHIBITS |
| EXHIBIT INDEX TEMPLATE | 16 | E1 | 14 | EACH EXHIBIT INDEX CONSISTING OF: |
| INSTITUTION ID | 4 | C2 | 2 | 2 BYTES BINARY CODED |
| SIGN ID | 4 | C3 | 2 | 2 BYTES BINARY CODED |
| TIME STAMP | 6 | C4 | 4 | 4 BYTES BINARY UNIX TIME |
| ITEM INDEX TEMPLATE | 6 | E2 | 4 | EACH ITEM INDEX CONSISTING OF: |
| ITEM ID | 4 | C5 | 2 | 2 BYTES BINARY CODED |
| CONTENT DATA TEMPLATE | 104 | E3 | 102 | EACH DATA OBJECT CONSISTING OF: |
| DATA | 102 | C6 | 100 | 100 BYTES BINARY CODED |

SITE-SPECIFIC INTEREST PROFILING SYSTEM

FIELD OF THE INVENTION

The present invention relates generally to information storage and retrieval systems and, more particularly, to systems that allow users to selectively capture their interests and retrieve information based on their particular interests and desires and which provide for the ability to analyze users' interests and desires.

BACKGROUND OF THE INVENTION

Institutions and facilities which are visited, toured or otherwise used by people, for example, botanical gardens, parks, zoos, museums, galleries, historic sites and structures, entertainment attractions, and related public and private institutions, typically place items on display in large physical settings to serve an educational, entertainment or commercial purpose relating to the specific nature of the site and/or attractions on exhibit or display at such sites. People visit these sites based on their interests, and generally a limited amount of site-specific and/or theme-specific information about the items on display may be provided through, for example, signage, printed handouts, computerized information kiosks, guided tours, and the like. Typically, the institutions and facilities have a much broader and extensive collection of information about their specific displays or exhibits than is practical or otherwise made available to visitors. However, in order to potentially access this broader collection of information, a visitor to such institutions or facilities must take some affirmative action at a later point in time, i.e., after their interest has been piqued or heightened by a particular display. This action generally requires the visitor to conduct research or investigation at a later point in time, e.g., by: contacting the institution or facility to request additional information; by conducting research at the institution's or another's library; or perhaps by conducting on-line research via the Internet or World Wide Web. The nature of the limited access to information and the necessity of taking proactive steps to acquire additional information in the future requires that the visitor retain their interest in the displays or exhibits and recall or somehow record relevant information about such displays or exhibits until such time as they are able to conduct further investigation or research. Accordingly, additional information pertaining to such exhibits, displays or sites is infrequently, if ever, obtained by visitors and, in the unlikely event it is, the nature, quality, accuracy and extent of the additional information is questionable.

In order to enhance the visitors' experience, to attract and retain additional visitors, and to effectively market and/or sell their products and/or services, such institutions and facilities have a recognized need to continuously refine and perfect their information products and services and the delivery thereof. Such desired and necessary refinements include both the type and amount of information made available to visitors and the manner with which the information is delivered to visitors. However, given the current state of the industry, such refinements are often difficult to accomplish due to, among other things: the large physical spaces in which such institutions, facilities, displays, exhibits and sites are typically located; the fact that many such institutions and facilities are frequently located outdoors; and the large number of visitors which attend such institutions and facilities. Indeed, these factors make direct behavioral observations of visitors difficult and, moreover, the entertainment or educational value of the experience to visitors may be diminished by requests for visitor feedback. As a result, one of the most difficult problems faced by such institutions and facilities is how to identify visitors' specific and detailed interests so as to provide continuously refined, personalized, properly tailored, and improved educational, entertainment, or commercial information products and services. Absent attempting to manually solicit visitors' feedback on specific items on display, institutions generally cannot obtain precise data. Additionally, such institutions and facilities do not presently have the ability to accurately determine whether visitors are interested in obtaining additional information pertaining to specific displays, exhibits or sites. Moreover, such institutions and facilities generally do not have an efficient method, if any, to identify and track the interests of its particular visitors, i.e., they lack knowledge as to what displays, characteristics and features visitors were and/or are attracted to or interested in. The ability to effectively gather, assimilate, and assess such information would allow institutions and facilities to more effectively, efficiently, and productively deliver and offer tailored products, services and information related thereto. The information that is provided to visitors by such institutions and facilities is usually chosen based on broad assumptions about what might be of interest to visitors as a whole, practical experience, and occasional visitor feedback, but is never specifically tailored to a particular visitor's needs and interests. To date, such institutions and facilities do not have a means, much less a reliable, efficient and effective means, to gather meaningful data regarding visitors' interests and to provide additional information to visitors.

Accordingly, a new system having the ability to: (i) provide customized, highly detailed information to visitors regarding exhibits, displays or sites of interest; (ii) extract information from large information databases; (iii) tailor such information to each visitor's specific interests; and (iv) gather and compile data regarding visitors' interests; would provide substantial benefits to such institutions and facilities.

Preferably, such a system would allow a customer of, or visitor to, such institutions or facilities to capture their interests at the moment they are piqued by any particular items at such institutions of facilities. The preferred system would allow the visitor to contemporaneously request and obtain additional information relating to their piqued interest, i.e., relating to one of the exhibits on display. Thus, the sites of interest or items on display at such institutions or facilities would be linked to appropriate information sources and/or databases. The request would be made as the visitor's interest arises, i.e., while they are viewing the particular display, or shortly thereafter, that invoked their interest and desire for further information, thus creating a real-time, direct connection between the visitor, their experience and interest in a particular item, and access to vast amounts of information related to that item and interest. The system would preferably have various methods for conveying or delivering the requested information related to particular exhibits, displays or sites to visitors and would allow visitors to chronicle their interests and, at a later point in time, request or receive additional information regarding their particular interests as new information relating to their interests becomes available. Preferably, the system would also record the visitor's interests to create personalized profiles for each visitor. The system would also preferably create, or provide an ability to create, a database of information reflecting visitors' interests relating to specific exhibits, displays and sites. Such interest profiles could then be used to provide or facilitate access to further information and/or to offer products and services tailored to visitors.

SUMMARY OF THE INVENTION

A preferred system for capturing, developing and profiling an individual's interests in one or more items on display at institutions or facilities and a means for providing site- and/or theme-specific information based on these interests, has now been invented. The preferred system of the present invention preferably includes one or more collections of information associated with specific sites and/or exhibits on display at such institutions or facilities, which information is organized and is capable of being indexed in coordination with each particular site, exhibit location or item on display. This collection of information is generally pre-existing although it can be tailored for the preferred system of the present invention. The content of the collected information may generally include, for example, the information developed or procured by the institution or facility, information licensed from third parties, information regarding products for sale by the institution or facility, and information from others (such as retailers) offering information, products and/or services related to such sites, exhibits, and items on display.

The preferred system further includes a plurality of portable information storage devices, such as, for example, smart cards having non-volatile memory capable of being organized into a specialized data structure. A visitor (or group of visitors) to such institutions and facilities taking advantage of the present invention would be uniquely assigned one such storage device. The data structure on the portable information storage device would preferably contain one or more fields including those designed to store biographical information about the visitor and an interest profile comprised of indexes relating to the exhibits on display at the institution or facility identified and/or selected by the visitor because of the visitor's interest in the exhibits.

A preferred system of the present invention further includes a means for allowing the visitor to select a particular exhibit of interest and for recording an index relating to the selection in the interest profile on the portable information storage device assigned to that particular visitor (or group of visitors). A preferred implementation of the present invention includes a smart card terminal located in close proximity to, or coordinated with, specific sites, exhibits, or displays at such institutions or facilities. Such smart card terminals preferably having the ability to write or record a site, exhibit or display index (or other identifying information) on or to the visitor's storage device that identifies the particular sites, exhibits or displays selected by the visitor, by location, identity, or other categorization or coding method or system. Preferably, the system further includes a means, such as, for example, a computer, an informational kiosk, or other device, for reading the stored indexes from the portable information storage devices and for retrieving the collected exhibit information and identified interests related to those indexes stored on the portable information storage device by the visitor. In one preferred embodiment, an information kiosk has the ability to retrieve such information from the visitor's assigned storage device and then deliver additional information relating to such identified and recorded interests to the visitor in one of more forms, such as, for example, displaying the information on a touch screen video display, printing out the information on paper, a disk, or other medium, or developing personalized Web pages, or the like, that the visitor may access at a later point in time at an informational kiosk, by telephone, by modem, or by a computer having access to the institution's or facility's prescribed information database via, by way of example, the Internet or similar means.

Preferably, the system may further develop and maintain an interest profile for each visitor (or group of visitors), wherein the interest profile catalogs the visitor's interests by compiling a database and list of the particular sites, exhibits and displays selected or identified by the visitor. The profile is preferably updated each time the visitor uses the storage device—both to record an interest in a particular exhibit on display and when accessing and reviewing the information related to those stored interests. The interest profile of particular visitors would preferably be maintained on the particular portable storage device assigned to the visitor and, likewise, all visitor interest profiles and variations thereof would be maintained by, or on behalf of, the institution or facility in a persistent collection of visitor interest profiles.

The interest profiles further may preferably also be used by the visitors themselves to track and access their interests at specific institutions or facilities (e.g., what sites they have visited; what sites they have not visited; what sites or information they were interested in; etc.) and while visiting other institutions. Similarly, visitors could preferably use such profiles in order to access information from various other databases or sources of information, and, preferably, may be used by the institution or others to offer uniquely tailored information, products and services to such visitors based on the interests revealed by the interest profiles. The collection of interest profiles further may be used by institutions and facilities to increase their understanding of the needs and interests of visitors and to measure the level of interest in particular exhibits and as an aid to planning new, or modifying existing, sites, exhibits or displays. Thus, the interest profile, shared between particular visitors and such institutions and facilities, may preferably be used as a tool and resource for both the visitor and the institution.

As will be recognized by those skilled in the art, the preferred system is not limited to use by the institutions or facilities set forth herein, such as botanical gardens, parks, zoos, museums, galleries and related public and private institutions, but can be used in a wide variety of settings such as amusement parks, retail stores (e.g., bookstores, department stores, etc.), athletic events (e.g., football, baseball, basketball, hockey venues), musical venues, and any number of other entertainment, commercial or non-commercial venues—any setting where there may be a need or desire to establish, in direct response to a momentary curiosity or interest, a connection between an object, exhibit, display, event, attraction, item, or the like, in the physical world and information relating to such interests.

BRIEF DESCRIPTION OF THE DRAWINGS

These and other features, aspects, and advantages of the present invention will become better understood with regard to the following description, appended claims, and accompanying drawings wherein:

FIG. 3 illustrates a preferred data structure for the portable information storage device of the present invention, in which the data structure is comprised of application information, demographic information relating to the holder of the portable information storage device, and an interest profile comprised of exhibit and/or item indexes relating to selected exhibits of interest;

These drawings are provided for illustrative purposes only and should not be used to unduly limit the scope of the present invention, it being recognized that any number of variations may be made of the present claimed invention.

DETAILED DESCRIPTION OF THE INVENTION

Figure 1:
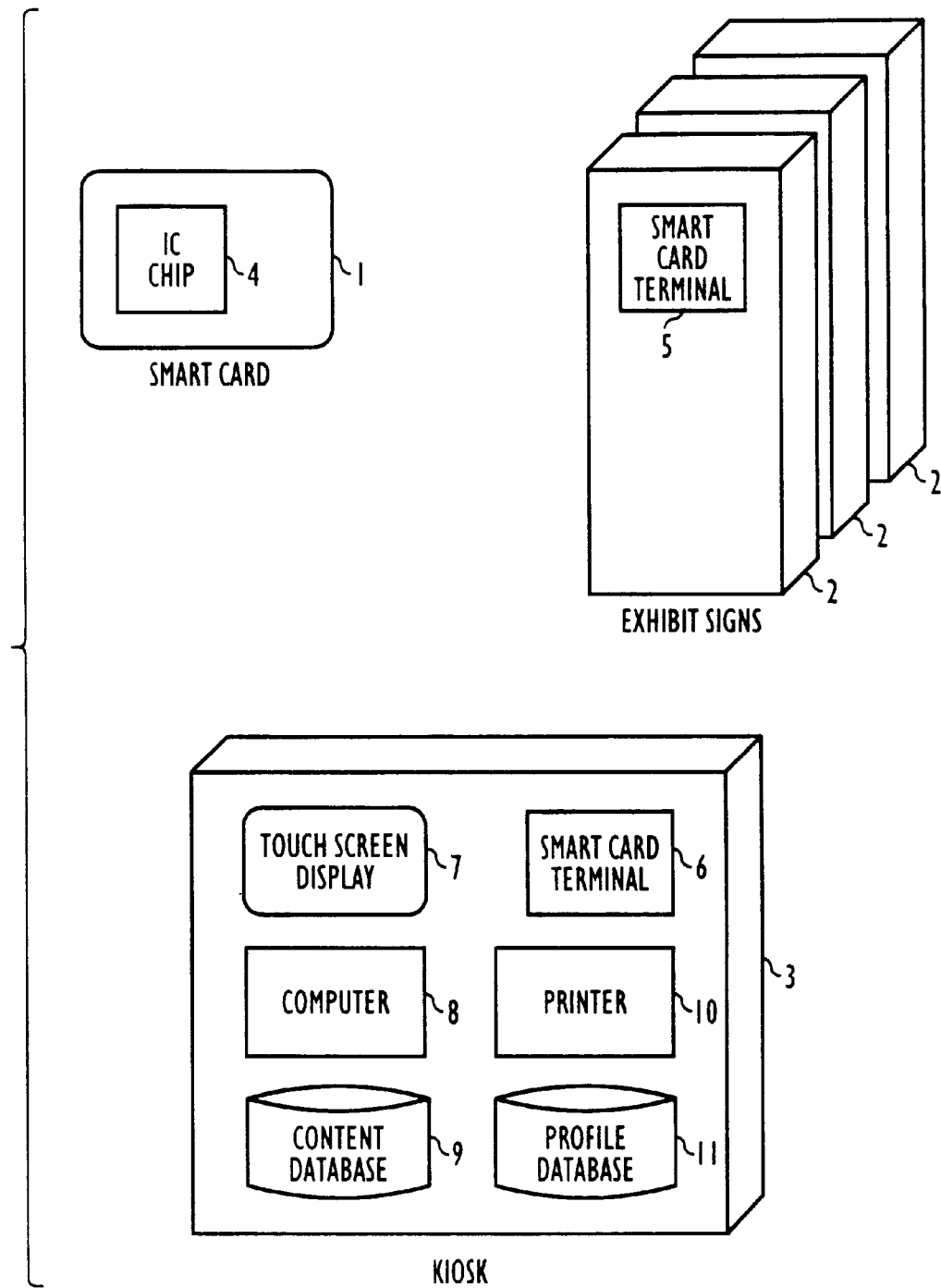
FIG. 1 is a block diagram illustrating the principal elements of a preferred interest profiling system of the present invention.

Referring to FIG. 1, therein is illustrated a preferred embodiment of the present invention that includes, as its principal elements, a portable information storage device 1, such as a tailored smart card, a plurality of exhibit signs 2, preferably stationed physically adjacent the various sites, exhibits or items on display (i.e., on view, exhibited, or on sale, for example, at a an institution), and an information kiosk 3. Each exhibit sign 2 is preferably positioned at a known location adjacent, and associated with, one or more particular sites or exhibits on display at an institution. The exhibits on display will vary depending on the particular institution hosting the interest profiling system. For example, if the institution is a botanical garden, the exhibits may include horticulture, statues, lawn and garden furnishings, gardening tools, etc. As additional examples, the sites, items or exhibits may correspond to particular attractions at an amusement park, books within a book store, exhibits displayed at an historical museum, paintings in an art gallery, animals in a zoo, athletes in a sports stadium, attractions in a national park, sites of interest in a city, as well as an unlimited number and variations of other applications. The present invention may also be used in more commercial settings, for example, at retail stores, wherein the "sites, exhibits or items" could include the various goods and/or services being offered for sale.

Preferably, each site, exhibit or item on display has an associated set of information relating to that particular exhibit stored within a content database. For example, if the institution is a botanical garden, the information may include information relating to a particular plant on display, such as the identification of the plant, a photograph or image of the plant, information relating to the care and maintenance of the plant, information relating to particular retailers offering the plant for sale, specialized instructions for growing the plant in the particular climate or region in which it is on display, illustrations of ways the plant may be used in home gardens, and interesting trivia about the plant. The content database is generally, but is not necessarily, pre-existing and may include information developed or gathered by the particular institution, information licensed from third parties, information available from third parties, information regarding products or services for sale by the institution, and possibly information from others, such as retailers, offering information, products and/or services related to the exhibits on display. This information is preferably grouped together into a content database and is coordinated with and capable of being indexed in any number of ways. The information related to a particular exhibit, by way of example, may preferably be indexed by a plurality of item indexes wherein each item index is uniquely assigned to one of the sites, exhibits or items on display. Alternatively, the content database may preferably be indexed using a plurality of exhibit indexes, wherein each exhibit index is associated with a particular location (e.g., an exhibit sign) and includes a location identifier identifying the location (within the institution) of the exhibit on display and a temporal identifier identifying the time period that the exhibit was displayed at that particular location. The exhibit index is preferably designed to account for situations whereby a visitor may store his interests in particular exhibits at one point in time, but not be required to attempt to request or retrieve information related to that exhibit until a later point in time. In the intervening time period, the exhibit on display may have been modified, relocated or removed from the institution altogether. Of course, if the particular exhibit is designed for permanent installation, the exhibit index may only consist of the particular location of the exhibit.

Figure 2:
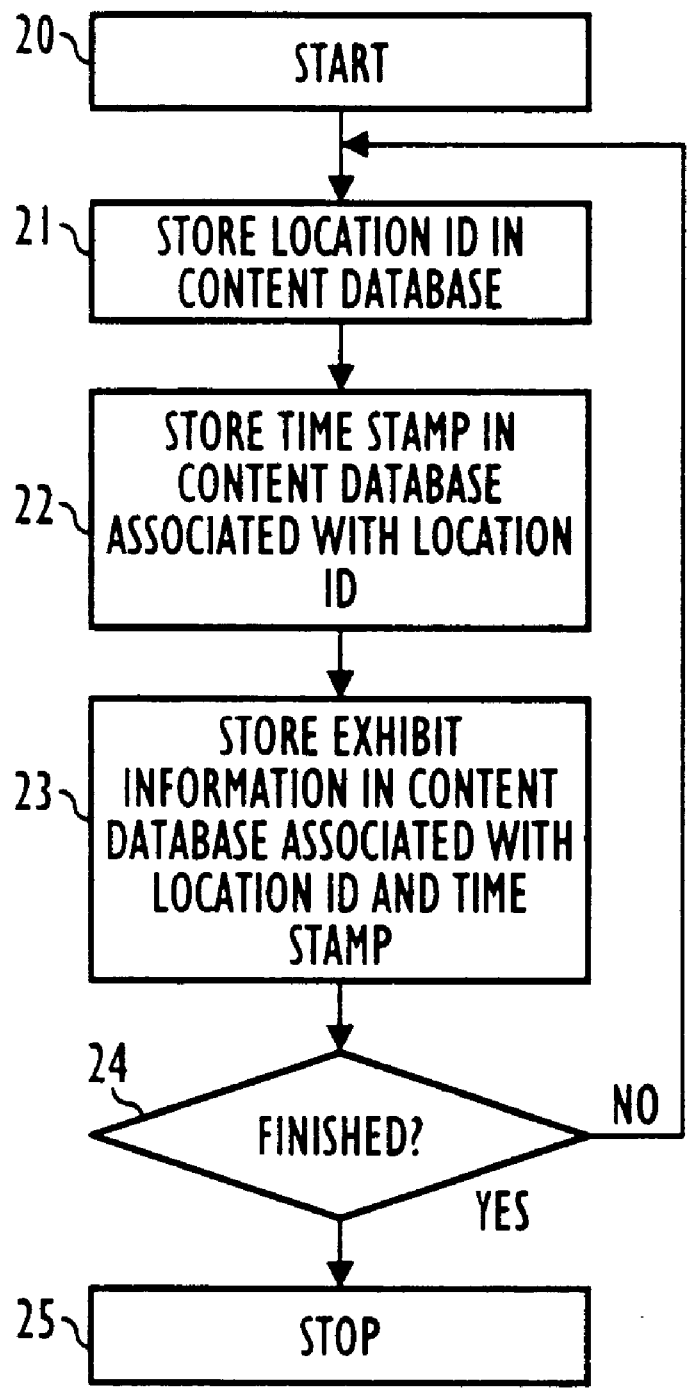
FIG. 2 is a flow diagram illustrating a preferred method for storing the location of each exhibit on display at an institution and the period of time each exhibit is displayed at that location, along with a preferred method for associating each exhibit on display with its exhibit information.

Turning now to FIG. 2, a preferred method for storing the location of each exhibit on display at an institution, and the period of time each exhibit was displayed at that location, as well as a preferred method whereby exhibit information is associated with each unique location and time record begins with step 20. For each site, exhibit or item location (i.e., exhibit sign), a location or other pertinent identifier associated with that particular exhibit location is stored in the content database in step 21. In step 22, a temporal identifier, identifying the time period a particular item was presented for display at the location, is stored in the content database in association with the location identifier. Thus, the content database contains a series of formation records that are capable of being indexed by the particular location, or other identifier, where the exhibit was on display, as well as the time period that the exhibit was displayed. In step 23, exhibit information relating to the location identified, by the location identifier during the time period identified by the temporal identifier is stored in the content database in association with and indexed by the location identifier and temporal identifier. Preferably, this step also includes the step of storing a unique item index that is directly related to the particular site, exhibit or item on display, regardless of the particular location or time period that the exhibit was displayed at an institution. The preferred method illustrated in FIG. 2 repeats in step 24 until such time as the content database contains a complete record of exhibit locations, their associated times, and any associated exhibit information (step 25). The preferred method of FIG. 2 may be used to build an initial content database and may be used to update an existing content database when sites, exhibits or items on display at a given location change, when additional sites, exhibits or items are put on display, or when additional information about the sites, exhibits or items on display become available.

It should be noted that, as will be understood by those skilled in the art, the location identifier (or other identifier) can preferably consist of any number of possible means for recording the location or site, including, for example, a unique identifier for an exhibit sign whose physical location is known. Alternatively, the location identifier can consist of a latitude, longitude, and possibly an altitude as might be recorded by a global positioning system, or other available methods. In a preferred implementation, the content database would be updated through reapplication of the method shown in FIG. 2 with a "no delete" policy so that an historical record of exhibit information would be maintained.

Each exhibit sign 2 is preferably positioned at a known location adjacent, and associated with, particular sites, exhibits or items on display at an institution. The interest profiling system may include a separate exhibit sign 2 for each exhibit on display. Alternatively, a single exhibit sign 2 may be associated with a particular location near a number of exhibits; however, the system must then include a means for differentiating among the particular exhibits near the exhibit sign 2 in order to determine which particular exhibit the user was interested in. This is preferably accomplished by the information kiosk 3 described below. Each exhibit sign 2 preferably includes a communication terminal, such as smart card terminal 5 capable of communicating with the portable information storage device 1. For example, the smart card terminal 5 may have a contact interface (such as a conventional card reader/writer device having a slot for accepting the smart card) or contactless interface (such as a conventional card reader/writer device wherein the smart card temporarily interacts with the smart card terminal when the smart card is held in close proximity to the card reader/writer device). The smart card terminal 5 also preferably includes conventional electronics capable of reading and/or writing information from and to the portable information storage device 1. Preferably, the exhibit sign 2 further includes printed information and instructions as is customary on conventional signage on a conventional kiosk.

Preferably, each person or group of persons (for example an entire class of students) using the interest profiling system is uniquely assigned a portable information storage device 1, which is used by them to identify and track their interests in the various exhibits on display. The portable information storage device 1, such as a smart card, is preferably a small portable device and contains a computing device, such as integrated circuit chip 4, or similar processing device, and a contact or contactless interface that allows the chip to communicate with conventional smart card reader/writer terminals. The portable information storage device 1 also preferably includes a non-volatile memory organized into a data structure that can store the exhibit indexes and/or the item indexes corresponding to the exhibits on display. FIG. 3 illustrates a preferred data structure for the smart cards for one implementation of the present invention. Information 30 identifying this unique application would preferably be provided as required by the International Standards Organization guidelines governing standard use of smart cards (ISO 7816-4). A path field would point to the location on the smart card memory map where the current system would read and/or write its proprietary data.

Continuing with FIG. 3, cardholder demographic information 31 preferably consists of information such as name, gender, date-of-birth, address, and telephone number and other similar information identifying the person or group of persons assigned to the portable information storage device 1. Application data 32 may be comprised of a card use sequence number showing the number of times the card has been used and a personal interest profile 33 used to record those exhibits of interest to the person or group of persons assigned to the particular portable information storage device 1. For example, the interest profile 33 may consist of an array of exhibit indexes and/or item indexes associated with the exhibits of interest to the visitor. Each exhibit index template is comprised of a location identifier (shown in this example as an institution ID for the particular cultural institution and a sign ID identifying the location of a particular exhibit sign within the cultural institution) and preferably a temporal identifier, consisting, for example, of a binary UNIX time identifier, which is the number of elapsed micoseconds since Jan. 1, 1970, UTC (Universal Coordinated Time). Preferably, each item index template is comprised of a record designed to store a value assigned to a particular site, exhibit or item on display. Of course, modifications to this basic data structure could be made in order to accommodate other types of location information, such as that used by a global positioning system.

In one embodiment, using a portable information storage device 1 having a sufficiently large memory device, the application data 32 may also include a number of content data records 34 to directly store the information related to the selected exhibits on display. In this embodiment, the exhibit sign terminal 5 further includes hardware and associated software to retrieve the exhibit information related to the particular adjacent exhibit from a content database and to store this information directly to the portable information storage device 1. When the visitor identifies a particular exhibit as being of interest, the visitor engages the portable information storage device 1 with the exhibit sign terminal 5. The information stored in the content database relating to the selected exhibit is then downloaded to the portable information storage device 1 by the exhibit sign terminal 5.

The information kiosk 3 preferably includes a card terminal 6, also designed to communicate with the portable information storage device 1, and a touch screen or other computer display 7 that enables visitors to interact with the information kiosk's embedded system computer 8, which controls the overall kiosk system. As described below, under control of the kiosk computer 8, and as directed by visitor input through, for example, a touch screen software interface, site-specific information may preferably be selected and retrieved from a content database 9 and delivered by way of, for example, the touch screen display and the kiosk printer 10. Information about the visitor's selected items of interest and details about their interactions with the system are preferably recorded in the profile database 11, as described in detail below.

As described above, the content database 9 contains the information related to certain exhibits on display at the cultural institution. While FIG. 1 identifies the content database 9 being stored within the information kiosk 3, those skilled in the art will appreciate that one or more content databases 9 may be stored apart from the information kiosk 3, such as in a central computer facility networked to the information kiosk 3. Additionally, it will be appreciated that the individual components comprising the information kiosk 3 illustrated in FIG. 1 may be packaged together in a stand-alone computer kiosk device, they may also be distributed among several networked computing devices. For example, an institution may have a number of devices having user interaction devices (including, for example, a touch-screen display and a card terminal), such devices may be networked to a single computer facility hosting a system computer 8, content database 9, profile database 11, and printer 10. Additionally, a visitor may be able to use his/her telephone and/or home or office computer system, having appropriate software and a device for reading/writing from/ to the portable information storage device 1, which is networked or may communicate with an institution's computer facility hosting the content 9 and profile databases 11.

Referring still to FIG. 1, preferred use of the interest profiling system may now be described as follows. Visitors to an institution are provided with a portable information storage device 1, on which may preferably be stored identifying demographic information, such as, for example, the visitor's name, address, and date-of-birth. As the visitor moves through an institution and views or experiences the sites, exhibits or items on display, a plurality of exhibit signal 2 placed throughout the institution and adjacent to particular exhibited items provide the visitor with opportunities to acquire additional information about the exhibits on display. If the visitor has an interest in a particular site, exhibit or item on display and desires further information, the visitor may cause the portable information storage device 1 to temporarily interact with the smart card terminal 5 of the exhibit sign 2 located adjacent that particular exhibit in such as way as to allow smart card IC chip 4 and the exhibit sign terminal 5 to exchange data. For example, the visitor may insert the portable information storage device 1 into a slot on the smart card terminal 5 designed to accept the portable information storage device 1 or, if the portable information storage device 1 and the exhibit sign terminal 5 have contactless interfaces, the visitor would hold the portable information storage device 1 near the interface on the smart card terminal 5. The smart card terminal 5 downloads an exhibit index, uniquely assigned to that particular exhibit sign, or an item index, uniquely assigned to the exhibit displayed adjacent to the exhibit sign, to the appropriate location in the interest profile 33 of the data structure contained on the smart card 1. The exhibit index downloaded would preferably include a location identifier and a temporal identifier, i.e., the date and time the exchange occurred.

The process outlined in the preceding paragraph may be repeated as many times as desired by the visitor. That is, as the visitor continues to move through an institution and identify other sites, exhibits or items of interest, he or she uses the portable information storage device 1 to download further site, exhibit or item indexes into the interest profile. At a later time, perhaps at the conclusion of the visit to the institution, the visitor may acquire additional information about the sites, exhibits or items identified by the indexes stored on the portable information storage device. For example, the visitor may use the information kiosk 3 to obtain further information by engaging the smart card 1 with the smart card terminal 6 on the information kiosk 3 (for example, by inserting the smart card into a slot in the smart card terminal 6, touching the smart card 1 to the terminal 6, or any other similar mechanism). The information kiosk 3 preferably reads the user's name and the exhibit and/or item indexes from the smart card 1. If an exhibit index is stored in the interest profile 33 (comprising a location identifier and/or a temporal identifier), the information kiosk associates the particular location identifier and/or the temporal identifier, with the appropriate information contained in a content database 9.

Figure 4B:
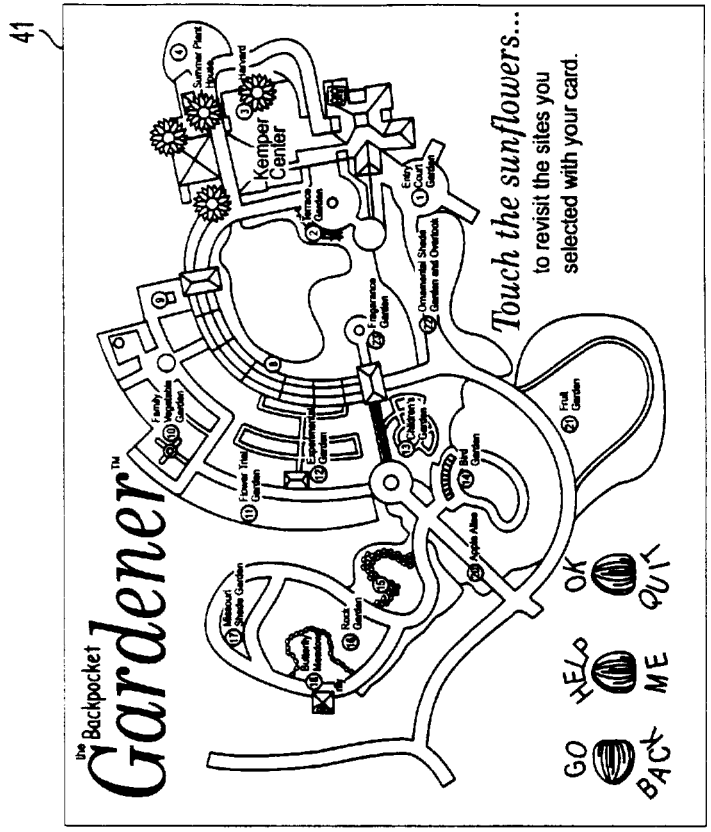
FIG. 4 illustrates elements of a preferred touch-screen user interface for an informational kiosk which may be employed in connection with the present invention.
Figure 4A:
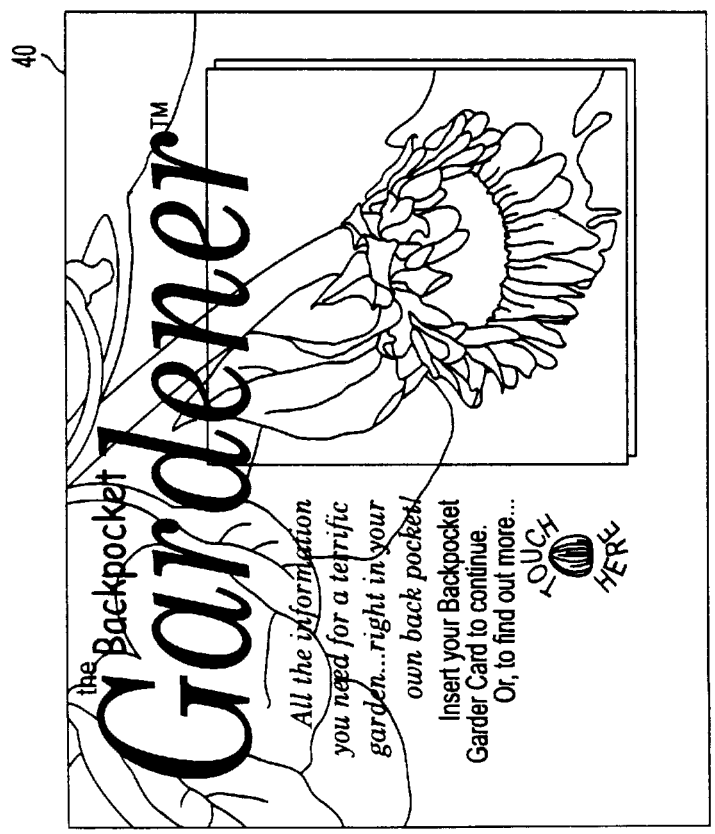
Figures 4C, 4D:
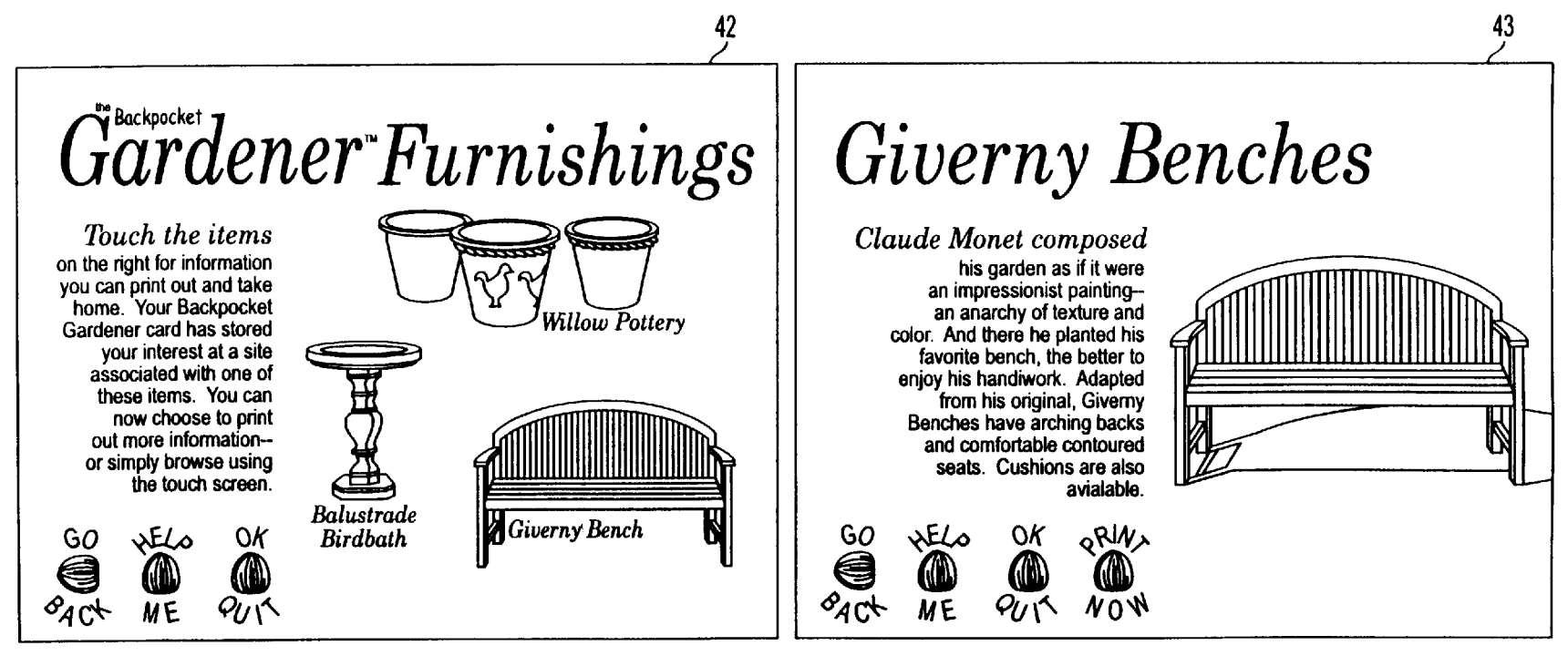

Preferably, under control of the kiosk computer 8, appropriate software-driven user interface screens 40 would be provided to the visitor by way of, for example, a touch screen display 7. Preferably, as illustrated in FIG. 4, the visitor is shown a listing of the exhibits selected during the visit, perhaps by a graphical representation or map of the institution 41, which highlights those exhibits selected during the visit. Additionally, the graphical representation may also indicate the exhibits that were not selected by the visitor, which may be useful in identifying to the visitor exhibits or attractions that were not selected but may nonetheless be of interest to the visitor. In the event that the exhibit signs are located near more than one particular exhibit, the user interface screens preferably include a means for allowing the visitor to differentiate between the particular exhibits and identify the particular exhibit of interest. For example, the user interface screen may preferably display a list (using, for example, words or figures) of the exhibits located adjacent one of the selected locations and allow the visitor to select the particular exhibit or exhibits of interest (as shown in screen display 42).

Preferably, the visitor is presented with opportunities to selectively review information about the selected sites, exhibits or items of interest. For example, by using a touch screen 7, or another appropriate selection mechanism, the visitor may select a particular exhibit as shown in FIG. 4. A portion of the information stored in a content database associated with the particular selected exhibit is preferably communicated to the visitor by displaying the portion of information on the display 7 (as shown in screen display 43). Additionally, if desired, the visitor could choose to have the additional exhibit information communicated, for example, by sequentially displaying the information on the display 7, by printing the information on the kiosk printer 10, by downloading the information to a data storage device (such as a computer diskette or the portable information storage device 1), by instructing the information kiosk to send the information to a particular e-mail address, or any other number of methods including those discussed below. For example, upon selecting a particular exhibit to review (by, for example touching the touch screen display 7 adjacent to the highlighted exhibit as shown in FIG. 4 ), the kiosk computer interacts with the stored database of exhibit information and extracts that information related to the selected site, exhibit or item.

Figure 5:
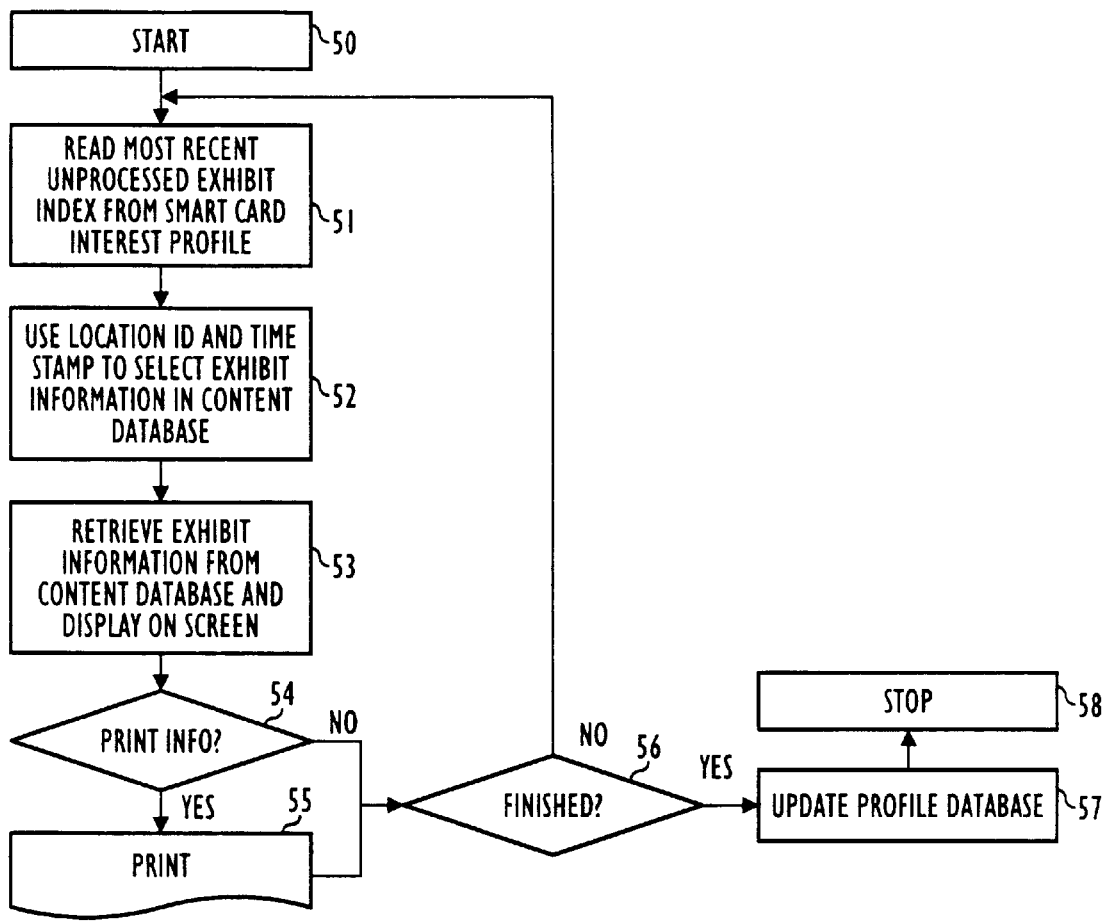
FIG. 5 is a flow diagram illustrating a preferred method for reading the exhibit and/or index from the portable information storage device, a preferred method responsive to the location and temporal identifiers for identifying the particular exhibit on display at that particular location and at that particular time, and a preferred method for retrieving and delivering the information associated with the identified exhibit on display.

The information is preferably extracted from a content database 9 using either the exhibit indexes or the item indexes stored within the interest profile on the portable information storage device 1. Turning now to FIG. 5, therein is shown a flow diagram illustrating a preferred method for reading exhibit indexes from the portable information storage device 1 and, responsive to the location and temporal identifier of each exhibit index, for identifying the particular exhibit on display at that particular location and at that particular time, along with a preferred method for retrieving the information associated with the identified exhibit on display.

Exhibit indexes are processed when a portable information storage device 1 carrying one or more exhibit indexes is engaged with the kiosk's smart card terminal 6. Under the control of the kiosk computer 8, the location and temporal identifier are extracted from the most recent unprocessed exhibit index as shown in step 50. In step 51, the location and temporal identifier, which have been read from the portable information storage device 1, are preferably used to index and select a specific element of exhibit information from a content database 9 by searching for records of exhibit information from a content to the location and temporal identifier (step 52). The selected exhibit information, or a portion thereof, is retrieved from the content database 9 in step 53 and delivered to the visitor by way of the system kiosk's touch screen display. The visitor may then preferably be presented the option of reviewing additional information related to the selected exhibit or printing out the information in steps 54–55. The exhibit indexes in the interest profile 11 are processed in non-ascending order by time in step 56 until the visitor chooses to stop. After the final exhibit index has been processed, the cultural institution's profile database is updated in step 57 as described in detail in the following paragraph. The method stops in step 58.

A similar method is used to preferably process the item indexes stored within the interest profile on the portable information storage device 1, which directly identify the selected exhibits. Using the item indexes, the selected exhibit information, or a portion thereof, is retrieved from a content database 9 in step 53 and delivered to the visitor by way of the system kiosk's touch screen display 7. The visitor may then preferably be presented the option of reviewing additional information related to the selected exhibit or printing out the information in steps 54–55. The item indexes in the interest profile are processed sequentially in step 56 until the visitor chooses to stop. After the final item index has been processed, the cultural institution's profile database 11 is updated in step 57 as described in detail in the following paragraph.

The information kiosk 3, or similar device, may also preferably be configured to allow the visitor to purchase the particular selected items. For example, the touch screen display may include information provided by a commercial retailer about the cost of the item, ordering information, shipping information, etc. Furthermore, the information kiosk may provide means for managing a purchase transaction wherein a visitor may, in real time, submit a purchase request to the commercial retailer for the item of interest and may additionally execute electronic payment for the purchased item using conventional means. In such a configuration, the interest profiling system of the present invention would be combined in a novel way with conventional means for managing electronic transactions and would thereby improve the efficiency and effectiveness of both traditional and new electronic forms of commercial activity.

Preferably, the interest profiling system of the present invention also provides a means for monitoring and recording particular information each time a visitor uses their assigned portable information storage device 1. For example, a persistent record of the exhibits that the visitor has selected may be permanently maintained (at least until purposefully erased) in the interest profile on the portable information storage device 1. A list of the particular exhibits selected by a particular visitor may also preferably be maintained by an institution in the profile database 11. For example, each time a visitor uses their portable information storage device 1 (either at an exhibit sign 2 or at the information kiosk 3), the system may record characterizing information, including the identity of the visitor and the exhibits selected, into a location within the profile database 11 associated with the particular visitor. In addition, session monitoring information about the visitor's interactions with the kiosk touch screen display 7 may preferably be recorded in the profile database 11. System monitoring information may include, for example, information such as which user interface screens and exhibit information were accessed, the sequence in which screens and information were accessed, and the duration each screen or body of information was viewed, etc. Such information, which may preferably be stored within the profile database 11, can be of value to the institution as a means of, for example, evaluating the effectiveness of the information delivery system. Additionally, the profile database 11 provides a means for allowing the cultural institution to review and analyze the sites, exhibits and items of interest to a particular visitor and offer or suggest other exhibits, information, products and/or services that may be tailored or of further interest to the visitor. These offers or suggestions may be communicated to the visitor in a number of ways, including mail, e-mail, or posted to the visitor's personalized Web page as described below.

Figure 6:
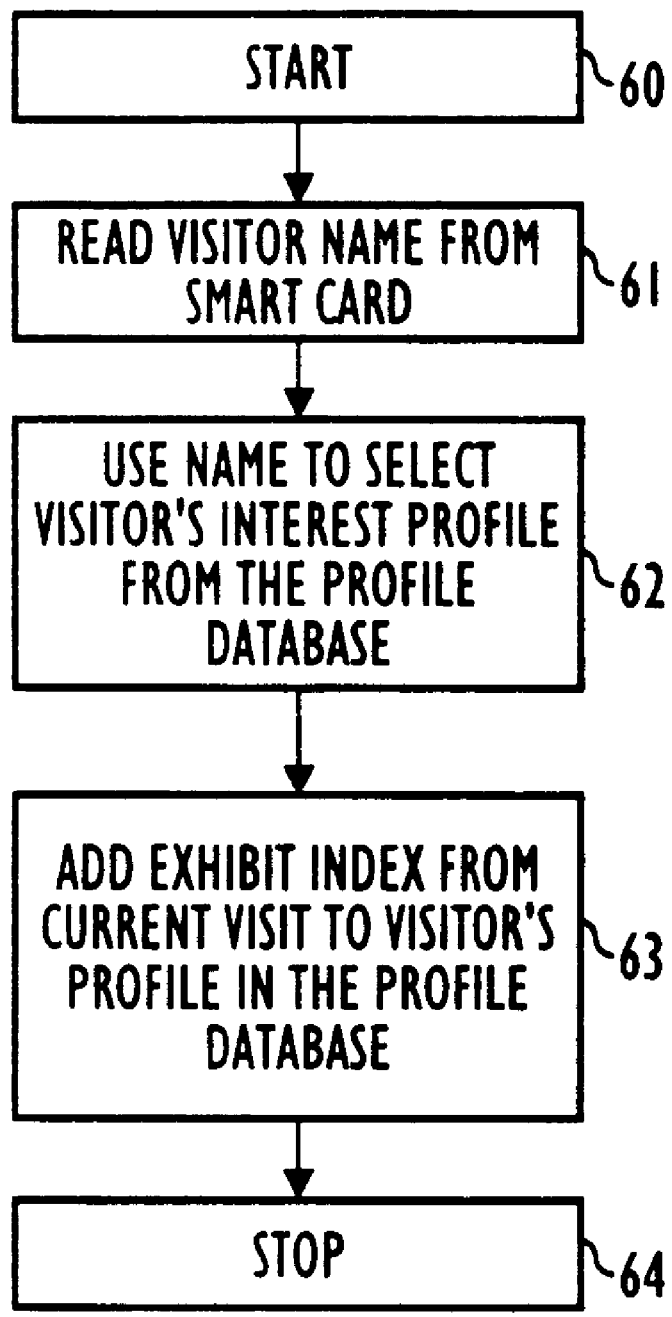
FIG. 6 is a flow diagram illustrating a preferred method for reading identification information related to an assigned visitor from portable information storage devices assigned to a visitor and a preferred method responsive to visitor identification information for creating a persistent record of selected exhibit and/or item indexes in a collection of visitor interest profiles maintained by an institution.
Figure 7A:
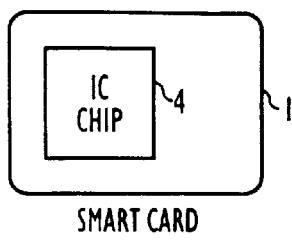
FIG. 7 is a block diagram showing the preferred principal elements of another embodiment of the present invention.
Figure 7B:
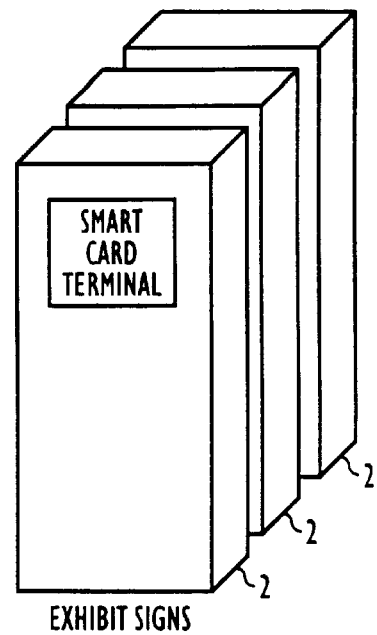
Figure 7C:
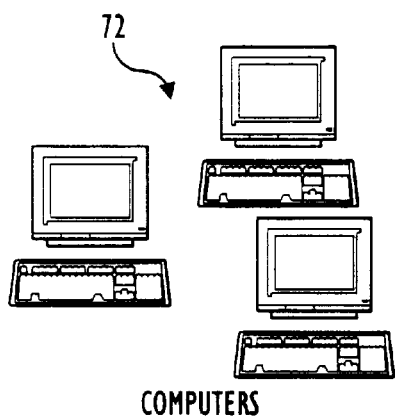
Figure 7D:
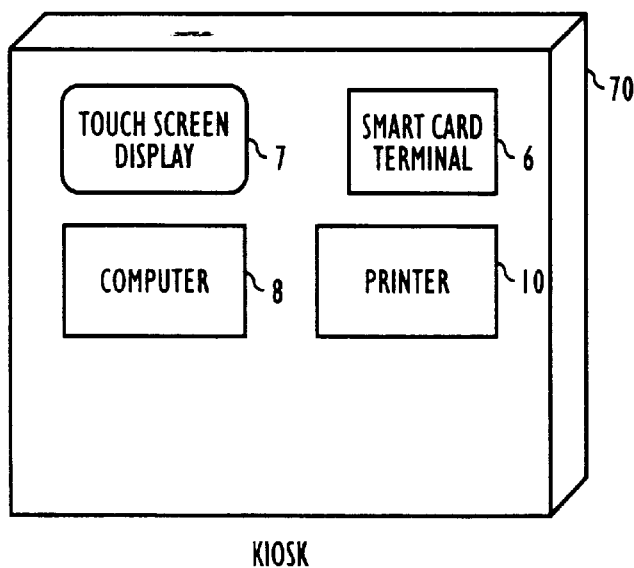
Figure 7E:
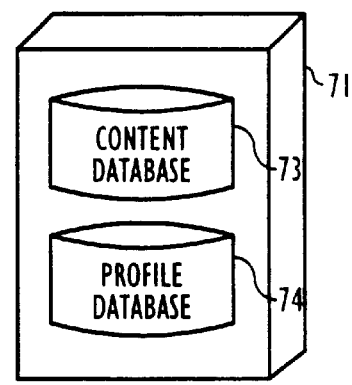

Referring now to FIG. 6, which is an elaboration of step 57 of FIG. 5, therein is illustrated a preferred method for creating a persistent record of visitor's interests beginning with step 60. In step 61, the visitor's name or other identifying data is preferably read from the data structure contained on the portable information storage device 1 by the kiosk terminal 6 under control of the kiosk computer 8. The visitor's name is then used, in step 62, as an index to select a unique profile record in the profile database 11 corresponding to that particular visitor or, if none exists, to initialize a unique profile record. In step 63, all exhibit and/or item indexes that have been collected on the portable information storage device 1 during the current visit are appended to the visitor's profile in the profile database 11 associated with visitor. The method end in step 64.

Turning now to FIG. 7, therein is illustrated another preferred embodiment of the present invention that includes portable information storage devices 1, exhibit signs 2, information kiosks 70, an Internet-accessible database server 71, and Internet-accessible computers 72. The preferred scenario-of-use described in relation to FIG. 1 is similar for this embodiment illustrated in FIG. 7, however, the content database 73 and profile database 74 reside on a networked database server. Therefore, in this embodiment of the invention, it is possible for visitors to perform all aforementioned kiosk operations on networked computers (located, for example, at their homes, schools, or offices) having smart card terminals and capable of interacting with the database server. The preferred implementation of this embodiment utilizes World Wide Web (Web) technologies including a Hypertext Transfer Protocol (HTTP) server on the database server machine and a distributed, Web-based user interface that is accessible by way of a Web browser on the client-side computers.

Figure 8:
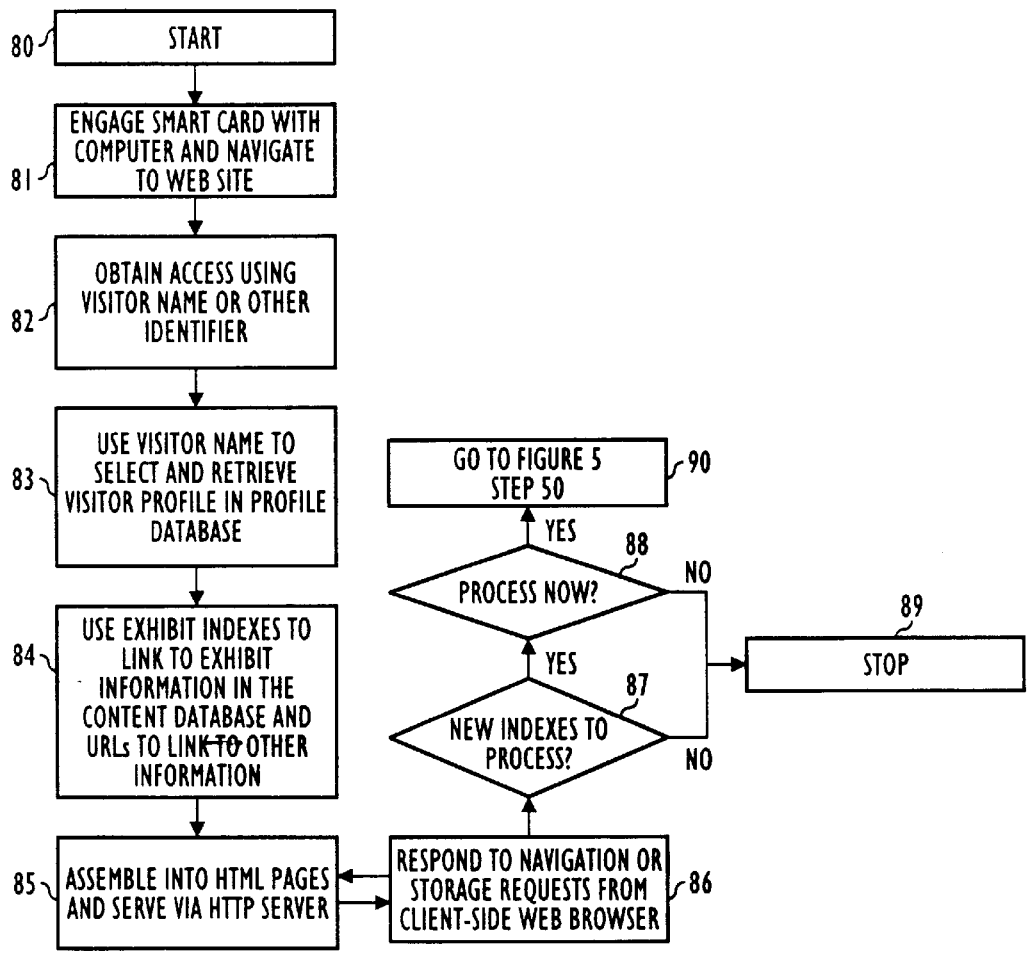
FIG. 8 illustrates a preferred method for developing personalized Web pages associated with each visitor and a preferred method for delivering the retrieved exhibit information using the personalized Web pages.

Using the basic communications architecture for this embodiment of the invention illustrated in FIG. 7, which is based on Web technologies, it is possible within this framework to construct and deliver personalized Web pages to the visitors. FIG. 8 illustrates a preferred method for developing personalized Web pages associated with each visitor and a method for delivering the retrieved exhibit information using the personalized Web pages. Such a method requires that the visitor's computer have an attached smart card reader/writer terminal. The visitor's portable information storage device 1 may be used for secure access to their personalized Web pages, historical profile data developed using the preferred interest profiling system, and for access and viewing of information related to newly acquired exhibit and/or item indexes stored on a recent visit to the cultural institution. The preferred method further allows the visitor profiles stored in the profile database 74 to include Universal Resource Locators (URLs), which may point to additional information accessible on the Web but not necessarily contained in the content database 73.

In steps 80 and 81, the visitor engages the portable information storage device 1 with the computer's smart card terminal 72 and navigates to the appropriate Web URL 81 that provides an entry point into the interest profiling system. The visitor's identifying information would be read from the portable information storage device 1, access rights would be verified, and, if appropriate, access would be obtained in step 82. The visitor name identifier is preferably used to select the visitor's profile from the profile database 83. Using the historical exhibit indexes associated with the visitor's name, the system would preferably build a list of links to the associated exhibit information in the content database 84 and build a list of other URLs that may exist in the profile. This information would be assembled into Hypertext Mark-up Language (HTML)-formatted Web pages and returned to the client computer 72 by the HTTP server 71 in step 85. Web browser-mediated requests by the visitor may result in selection, retrieval, assembly, and communication of information as the visitor navigates exhibit information that may be referenced through their stored profiles, as shown in steps 85 and 86. URLs referencing additional information of interest accessible via the Web but not necessarily contained in the content database controlled by the particular institution may be stored in the visitor profile by the visitor. Additionally, URLs may be stored automatically by the interest profiling system such as might be the case when a Web-based search is performed using keywords contained in the information stored in the associated collection of exhibit information. The URLs resulting from such a search would preferably be returned to the visitor's interest profile and would, over time and through repeated use of the interest profiling system of the present invention, provide a means for refining, expanding, and tailoring the information delivered both to visitors and to the cultural institutions. The navigation, assembly, and storage of information in the profile and content databases in a preferred implementation may preferably be mediated by Common Gateway Interface (CGI) scripts or other conventional information retrieval and/or Web programming methods.

If the interest profile stored on the portable information storage device 1 contains exhibit or item indexes, perhaps written to the card during a recent visit to a cultural institution, the visitor is preferably presented with the option of processing those exhibit or item indexes in steps 87 and 88. The visitor may choose to ignore the stored indexes (step 89), or may elect to process the exhibit indexes (step 90). If the visitor chooses to process the exhibit or indexes stored in the interest profile, the indexes may preferably be processed using the method of FIG. 5 beginning with step 50.

The profile database, stored on the information kiosk or other suitable computer facility, may be used to provide further information as it becomes available to particular visitors. For example, as additional information is developed or obtained by the cultural institution relating to a particular exhibit, the profile database may be searched to identify persons or groups of persons who previously selected that particular exhibit as being of interest. The cultural institution may then provide the additional information related to that exhibit by using a number of means, for example, mail, e-mail, or posting the information to the person's personalized Web page.

Preferably, the interest profile stored on the portable information storage device 1 may be used at a second cultural institution having a preferred information kiosk 3. Thus, the information kiosk located at the second cultural institution may store, or be able to access, information stored in a second content database that relates to the exhibits identified by the indexes stored on the visitor's portable information storage device 1. Using this preferred embodiment, the visitor may be able to identify the visitor's interests at a first cultural institution, obtain information from the first cultural institution, and then use the portable information storage device 1 to obtain information from a second cultural institution related to the exhibits on display at the first cultural institution. In this embodiment, the information kiosk at the second cultural institution includes a smart card terminal and associated computer processing means to read the exhibit and/or item indexes from the portable information storage device 1, associate those stored indexes with either particular exhibits on display at the second cultural institution or information stored within databases controlled by the second cultural institution.

The portable information storage device 1 may also be used as a conventional credit transaction card. Preferably, the data structure embodied within the storage device 1 may include additional records of information such as a credit transaction number, such as a VISA credit number. The information kiosk would also include conventional software and telephonic or other communications to permit the visitor to purchase particular exhibits by charging the purchase price against their credit account.

Preferably, the interest profile stored on the portable information storage device 1 may be used at a commercial retail establishment having a preferred information kiosk 3. Thus, the information kiosk located at the commercial retail establishment may store, or be able to across, information stored in a second content database that relates to the exhibits identified by the indexes stored on the visitor's portable information storage device 1. Using this preferred information from the first institution, and then use the portable information storage device 1 to obtain information from a commercial retail establishment related to the exhibits on display at the first cultural institution. In this embodiment, the information kiosk at the commercial retail establishment includes a smart card terminal and associated computer processing means to read the exhibit and/or item indexes from the portable information storage device 1, associate those stored indexes with either particular exhibits on display at commercial retail establishment or information stored within databases controlled by commercial retail establishment. In this embodiment, the system of the present invention serves both the visitor and the commercial retail establishment by providing means for recalling and communicating about items of interest that may now wished to be purchased at the commercial retail establishment.

The present invention shifts the visitor's information collection point to the moment that their interest in a particular exhibit is piqued. The invention is particularly useful in places that are spontaneous inquiry intensive. The invention also provides a means to extend the visitor's experience by adding a way to capture expressions of interests that are stimulated by the visit to a cultural institution, and linking those interests to a pre-existing database of information. Thus, the present invention creates a direct link between a person, their experience and interest in a particular item or location, and the vast amounts of information related to that item, and creates a new point-of-entry into the growing information distribution system that, unlike most conventional approaches, is completely controlled by the user of the system.

Although the present invention has been described in considerable detail with reference to certain presently preferred embodiments thereof, other versions and embodiments are possible without departing from the spirit and scope of the present invention. Therefore the appended claims should not be limited to the description of the preferred versions or embodiments contained herein.

We claim:

1. A system for providing information to a person or group of persons relating to items on display for viewing at one or more exhibit locations, the system comprising:
   a. a database of information coordinated with the exhibit locations and/or the items on display, the information being indexed to correspond to the exhibit locations using one or more exhibit indexes and/or to the items using one or more item indexes;
   b. one or more portable information storage devices, each device being assigned to a specified person or group of persons and having means for storing one or more exhibit indexes and/or item indexes;
   c. means for allowing each person or group of persons to select one or more of the exhibits and/or items as being of interest to that person or group of persons and for recording the corresponding one or more exhibit indexes and/or item indexes on the portable information storage device assigned to that person or group of persons, such selection and recording occurring contemporaneously with the person or group of persons viewing the items on display;
   d. means for retrieving the recorded exhibit indexes and/or item indexes from each of the portable information storage devices after the person or group of person has completed viewing the items on display;
   e. means for retrieving from the database the information corresponding to the exhibit indexes and/or item indexes retrieved from each portable information storage device; and
   f. means for communicating the retrieved database information to each person or group of persons who selected as being of interest the exhibits and/or items to which that information corresponds.

2. The system of claim 1 further comprising means for downloading to each portable information storage device the information corresponding to the exhibit indexes and/or item indexes retrieved from that portable information storage device.

3. The system of claim 1 wherein the means for allowing each person or group of persons to select one or more of the exhibits and/or items as being of interest to that person or group of persons and for recording the corresponding one or more exhibit indexes and/or item indexes on the portable information storage device assigned to that person or group of persons comprises a smart card terminal associated with each exhibit location and/or item on display.

4. The system of claim 3 wherein the smart card terminal corresponding to a given one of the exhibits or items is located adjacent to that exhibit or item.

5. The system of claim 4 wherein each portable information storage device comprises a smart card.

6. The system of claim 5 wherein each smart card has a non-volatile memory organized into a data structure having means for storing the exhibit indexes and/or the item indexes corresponding to the exhibits and/or items selected as being of interest by the person or group of persons to whom that smart card was assigned, wherein the index corresponding to a given one of the exhibits or items can be transferred into the data structure by causing the smart card to temporarily interact with the smart card terminal associated with that exhibit or item.

7. The system of claim 6 further comprising means for transferring into the data structure a location identifier identifying the location of each smart card terminal with which the smart card interacts and for associating each such location identifier with the respective exhibit index or item index corresponding to the exhibit or item with which each such smart card terminal is associated.

8. The system of claim 7 further comprising means for transferring into the data structure a temporal identifier identifying the date and time that the smart card interacts with each smart card terminal and for associating each such temporal identifier with the respective exhibit index or item index corresponding to the exhibit or item with which each such smart card terminal is associated.

9. The system of claim 6 further comprising means for transferring into the data structure a temporal identifier identifying the date and time that the smart card interacts with each smart card terminal and for associating each such temporal identifier with the respective exhibit index or item index corresponding to the exhibit or item with which each such smart card terminal is associated.

10. The system of claim 6 wherein the data structure of each smart card has means for containing demographic information related to the person or group of persons to whom each such smart card is assigned.

11. The system of claim 7 further comprising means for retrieving from the data structure of each smart card the location identifier associated with each exhibit index or item index, and wherein the means for retrieving from the database the information corresponding to the exhibit indexes and/or item indexes retrieved from the data structure of that smart card is responsive to the location identifier.

12. The system of claim 8 further comprising means for retrieving from the data structure of each smart card the location identifier and the temporal identifier associated with each exhibit index or item index, and wherein the means for retrieving from the database the information corresponding to the exhibit indexes and/or item indexes retrieved from the data structure of that smart card is responsive to the location identifier and to the temporal identifier.

13. The system of claim 9 further comprising means for retrieving from the data structure of each smart card the temporal identifier associated with each exhibit index or item index, and wherein the means for retrieving from the database the information corresponding to the exhibit indexes and/or item indexes retrieved from the data structure of that smart card is responsive to the temporal identifier.

14. The system of claim 5 further comprising means for downloading to the smart card the information corresponding to the exhibit indexes and/or item indexes retrieved from that smart card.

15. The system of claim 1 further comprising means for developing an interest profile for one or more of the persons or groups of persons.

16. The system of claim 15 wherein the means for developing an interest profile comprises means for storing the interest profile for a person or group of persons on the portable information storage device assigned to that person or group of persons.

17. The system of claim 16 further comprising means for analyzing the interest profile to develop recommendations regarding related information that may be of interest to the person or group of persons and means for communicating those recommendations to the person or group of persons.

18. The system of claim 15 further comprising means for updating the interest profile associated with each person or group of persons after the person or group of persons selects one or more of the exhibits and/or items as being of interest and the corresponding one or more exhibit indexes and/or item indexes are recorded on the portable information storage device assigned to that person or group of persons.

19. The system of claim 1 wherein the database of information is updated with additional information relating to the exhibits and/or items on display, and the system further comprises means for delivering such of the additional information as relates to the exhibits and/or items selected as being of interest to those one or more persons or groups of persons who selected those exhibits and/or items as being of interest.

20. The system of claim 1 wherein the means for retrieving the exhibit indexes and/or item indexes from the portable information storage devices, means for retrieving from the database the information, and means for communicating the retrieved database information comprises an information kiosk.

21. The system of claim 20 wherein the information kiosk further comprises means for displaying a representation of each of the exhibits and/or items selected by the person or group of persons as being of interest.

22. The system of claim 21 wherein the information kiosk further comprises means for displaying a representation of each of the exhibits and/or items that were not selected by the person or group of persons as being of interest.

23. The system of claim 20 wherein the information kiosk further comprises control means for allowing the person or group of persons to selectively review the information from the database associated with the exhibits and/or items selected by that person or group of persons as being of interest.

24. The system of claim 23 further comprising session monitoring means for monitoring and recording in the interest profile for that person or group of persons characterizing information concerning the person's or group's review of the information at the information kiosk, the characterizing information including how long the person or group of persons spent reviewing the information concerning each exhibit and/or item.

25. The system of claim 23 wherein the information kiosk further comprises a profile database for storing a plurality of interest profiles associated with the person or persons receiving information from the interest profiling system, and further comprising session monitoring means for monitoring and recording in the profile database for that person or group of persons characterizing information concerning the person's or group's review of the information at the information kiosk, the characterizing information including how long the person or group of persons spent reviewing the information concerning each exhibit and/or item.

26. The system of claim 20 wherein the means for communicating the retrieved database information includes printing means for generating a printout of information from the database.

27. The system of claim 20 wherein the information kiosk further comprises means for allowing purchase of the items on display and/or of duplicates of the items on display.

28. The system of claim 1 further comprising Web page generation means for developing a personalized Web page associated with each person or group of persons and wherein the means for communicating the retrieved database information to the person or group of persons who selected as being of interest the exhibits and/or items to which that information corresponds comprises means for storing the retrieved database information on the personalized Web page associated with the respective person or group of persons.

29. The system of claim 1 wherein each portable information storage device comprises a smart card that is also a transaction card.

30. The system of claim 1 further comprising means for allowing purchase of the items on display and/or of duplicates of the items on display.

31. A method for providing information to a person or group of persons relating to exhibits and/or items on display for viewing, the method comprising:
   a. providing the system of claim 1;
   b. assigning each portable information storage device to a specified person or group of persons;
   c. allowing each person or group of persons to select one or more of the exhibits and/or items as being of interest to that person or group of persons and to record the corresponding one or more exhibit indexes and/or item indexes on the portable information storage device assigned to that person or group of persons, such selection and recording occurring contemporaneously with the person or group of persons viewing the exhibits and/or items on display;
   d. retrieving the recorded exhibit indexes and/or item indexes from each of the portable information storage devices after the person or group of person has completed viewing the exhibits and/or items on display;
   e. retrieving from the database the information corresponding to the exhibit indexes and/or item indexes retrieved from each portable information storage device; and
   f. communicating the retrieved database information to each person or group of persons who selected as being of interest the exhibits and/or items to which that information corresponds.

32. A system for providing visitors to a first cultural institution with information relating to exhibits on display for viewing at the institution, the system comprising:
   a. a collection of exhibit information associated with the exhibits on display at the cultural institution, the collection of exhibit information being indexed by exhibit index;
   b. a plurality of portable information storage devices, each device being assigned to a specified visitor and having means for storing exhibit indexes;
   c. means for allowing each visitor to select one or more exhibits as being of interest and for recording the exhibit index corresponding to each such selected exhibit on the portable information storage device assigned to that visitor, such selection and recording occurring contemporaneously with the person or group of persons viewing the exhibits on display;
   d. means responsive to each recorded exhibit index for retrieving the exhibit information corresponding to each selected exhibit of interest from the collection of exhibit information after the person or group of person has completed viewing the exhibits on display; and
   e. means for communicating the retrieved exhibit information to each visitor who selected as being of interest the exhibit to which that exhibit information corresponds.

33. The system of claim 32 wherein it can also collect and profile the interest of visitors to the institution in the exhibits on display, the system further comprising means for developing for each visitor an interest profile stored on the information storage device assigned to that visitor, wherein the interest profile comprises characterizing information concerning the particular exhibits selected by the visitor.

34. The system of claim 33 wherein the characterizing information for each exhibit comprises the exhibit index.

35. The system of claim 34 further comprising means to allow the information storage device to be used at a second cultural institution so that the visitor to whom the information storage device is assigned can obtain information from the second cultural institution concerning the exhibits on display at the first institution for which characterizing information is stored in the interest profile of the information storage device.

36. A method for providing visitors to a first cultural institution with information relating to exhibits on display for viewing at the institution, the method comprising:
   a. providing the system of claim 32;
   b. assigning each portable information storage device to a specified visitor;
   c. allowing each visitor to select one or more exhibits as being of interest and to record the exhibit index corresponding to each such selected exhibit on the portable information storage device assigned to that visitor, such selection and recording occurring contemporaneously with the person or group of persons viewing the exhibits on display;
   d. retrieving the exhibit information corresponding to each selected exhibit of interest from the collection of exhibit information after the person or group of person has completed viewing the exhibits on display; and
   e. communicating the retrieved exhibit information to each visitor who selected as being of interest the exhibit to which that exhibit information corresponds.

37. A method for providing visitors to a first cultural institution with information relating to exhibits on display for viewing at the institution and for collecting and profiling the interest of visitors to the institution concerning the exhibits on display, the method comprising:
   a. providing the system of claim 33;
   b. assigning each portable information storage device to a specified visitor;
   c. allowing each visitor to select one or more exhibits as being of interest and to record the exhibit index corresponding to each such selected exhibit on the portable information storage device assigned to that visitor, such selection and recording occurring contemporaneously with the person or group of persons viewing the exhibits on display;
   d. retrieving the exhibit information corresponding to each selected exhibit of interest from the collection of exhibit information after the person or group of person has completed viewing the exhibits on display;
   e. communicating the retrieved exhibit information to each visitor who selected as being of interest the exhibit to which that exhibit information corresponds; and
   f. developing for each visitor an interest profile stored on the information storage device assigned to that visitor.

38. The method of claim 37 wherein the system further comprises means to allow the information storage device to be used at a second cultural institution so that the visitor to whom the information storage device is assigned can obtain information from the second cultural institution concerning the exhibits on display at the first institution for which characterizing information is stored in the interest profile of the information storage device, and the method further comprises means allowing the information storage device to be used at the second cultural institution.

39. The system of claim 16 further comprising means for assisting the person or group of persons in locating particular items on display, the means for assisting comprising means for retrieving the interest profile from the portable information storage device, and display means for displaying a map of the exhibit locations, the map illustrating the location of the particular items on display likely to be of interest to the person or group of persons.

* * * * *